United States Patent Office 3,313,605
Patented Apr. 11, 1967

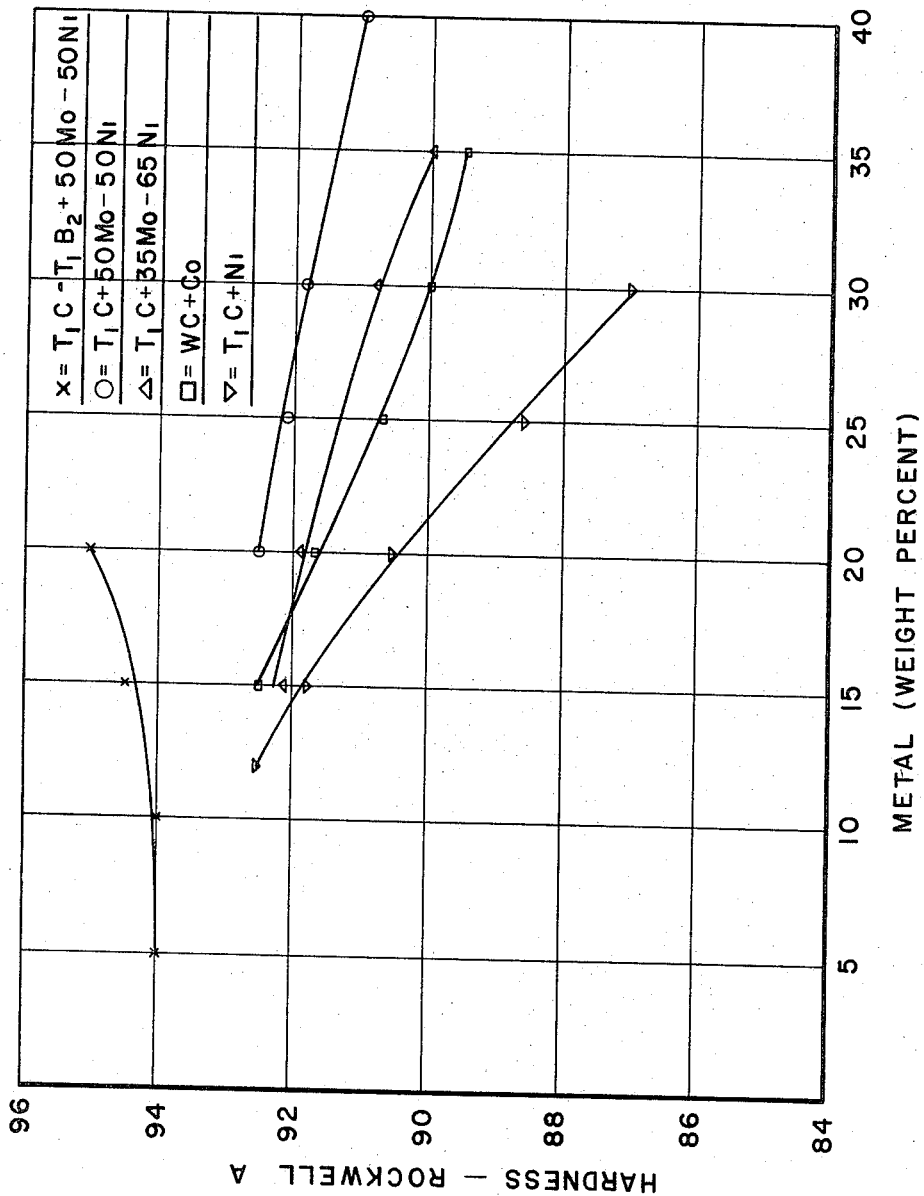

3,313,605
COMPOSITION INCLUDING A CARBIDE AND A BORIDE AND TOOL MADE THEREOF
Richard M. Gill, Northampton, England, assignor, by mesne assignments, to The Carborundum Company, Niagara Falls, N.Y., a corporation of Delaware
Filed Aug. 7, 1963, Ser. No. 300,605
Claims priority, application Great Britain, Aug. 13, 1962, 30,911/62
8 Claims. (Cl. 29—192)

This invention relates to improvements in hard cutting compositions which are particularly suitable for cutting tools used in machining operations. More specifically, the invention relates to cutting tools which are harder and more wear-resistant than cutting tools now in use.

For years, many industrial cutting operations have been conducted using metal carbide bodies. Probably the most commonly used of these is the carbide of tungsten, which cemented with cobalt, produces a cutting tool having good wear-resistant properties. However, the increasing needs for higher cutting speeds, closer tolerances, and better finishes have made necessary a search for harder, tougher and more wear-resistant materials for cutting tools.

In recent years, cutting tools of sintered aluminum oxide have been used in order to obtain high cutting speeds in machining operations. However, a major drawback of such material is its lack of toughness. It has, therefore, been necessary to restrict the use of such aluminum oxide cutting tools to operations where toughness is not a primary consideration. Various carbides, borides and nitrides, with or without the inclusion of metal binders, have been used in making cutting tools, but none of these materials has the proper characteristics of hardness, density, toughness, and resistance to wear to form cutting tools which are adequate for the extreme demands imposed on cutting tools at present.

An object of the present invention is to provide a cutting tool material which is harder and more wear-resistant than materials now in use.

Another object of the present invention is to provide a cutting tool having excellent wear-resistant properties.

It is a further object of the invention to provide a method for forming a hard, wear-resistant cutting tool.

Various other objects and advantages will appear from the following description of several embodiments of the invention, and the novel features will be particularly pointed out hereinafter in the appended claims.

It has now been discovered that a cutting tool having increased wear-resistant properties may be formed from a mixture of powdered titanium carbide and titanium boride together with from about 5 percent to about 30 percent by weight of a metal binder, the binder consisting of a mixture of molybdenum and nickel metal powders. Hereinafter the mixture of titanium carbide and titanium boride will be referred to as the ceramic constituent of the tool and the mixture of molybdenum and nickel powders will be referred to as the metal constituent of the tool.

Cutting tools made in accordance with this invention are preferably made by hot-pressing the ceramic and metal constituents as fine powders at temperatures in the range of from about 1500° C. to about 1650° C. and at pressures in the range of from about 1000 to about 2500 p.s.i. As will be discussed below in greater detail, the preferred temperature for the hot-pressing operation depends to some extent on the metals content of the mixture to be hot-pressed. Cutting tools made in accordance with this invention are harder and more wear-resistant than cutting tools now being used, including those made of cemented tungsten carbide. Neither titanium carbide alone or with a binder of molybdenum and nickel nor titanium boride alone or with a binder of molybdenum and nickel produce as hard or wear-resistant a cutting tool as the titanium carbide-titanium boride-metal binder composition of this invention.

The ceramic constituent, that is, the mixture of titanium carbide and titanium boride powders, constitutes from about 70 percent to about 95 percent by weight of the total composition which is to be hot-pressed, with the remainder of the composition consisting of the metal constituent. The ceramic constituent of the composition is composed of from about 70 percent to about 80 percent by weight of titanium carbide and from about 20 percent to about 30 percent by weight of titanium boride. A mixture of 70 percent TiC and 30 percent $TiB_2$ has been found to produce excellent hard, wear-resistant cutting tools and is the preferred mixture for the ceramic constituent of the composition. While the metal constituent, that is, the mixture of molybdenum and nickel metal powders, of the composition may constitute from about 5 percent to about 30 percent by weight of the total composition, it has been found that cutting tools containing from 10 percent to about 20 percent of the metal constituent show especially good wear resistance. In cutting tools made in accordance with this invention, the molybdenum and nickel are present in the mixture in approximately equal parts by weight. Therefore, the preferred composition which is to be hot-pressed into cutting tools in accordance with this invention comprises from about 80 percent to about 90 percent by weight of a powdered mixture of 70 percent by weight titanium carbide and 30 percent by weight titanum boride together with from about 10 percent to about 20 percent by weight of a metal binder, the binder consisting of equal parts by weight of molybdenum and nickel metal powders.

In order that the invention may be more clearly understood, the invention will now be described in connection with the following specific examples. All proportions expressed as parts or percentages are parts or percentages by weight.

*Example I*

Lathe cutting tools embodying the present invention were made in the following manner. A mixture of 70% by weight titanium carbide and 30% by weight titanium boride was milled in a Steele-Shaw mill using a steel pot and balls. The mixing was continued until an intimate mixture was obtained. The cutting tools were then formed from a mixture containing 90% of the ceramic constituent described above together with 10% of a metal constituent containing equal parts by weight of molybdenum and nickel metal powders. The mixture was hot-pressed in a graphite mold at a temperature of 1530° C. and a pressure of 2000 p.s.i. The tools were pressed to approximately finished tool size and only a light finish grind was necessary to obtain the finished tool shape. The finished cutting tool was then placed in a conventional tool holder and used to cut 50–60 ton nickel chrome molydenum steel. It was found possible to take a cut of 0.1 inch with a work speed of 1600 s.f.p.m. with no sign of welding to the work. Land wear was low and very smooth.

*Example II*

In order to demonstrate the importance of having at least 5% by weight of the metal binder in the cutting tool composition, several cutting tool compositions were prepared in which the percent of metal binder in the composition was varied. The compositions were the same except that the metal constituent content was varied. In each case the tool composition consisted of a ceramic constituent and a metal constituent. The total amount of ceramic constituent of course varied with the metal constituent content but in each instance consisted of 70 percent by weight TiC and 30 percent by weight TiB$_2$. The molybdenum and nickel powders of the metal constituent were present in equal amounts by weight. Cutting tools were hot-pressed from the mixes according to the procedure as set forth in Example I. The cutting tools thus prepared were tested to determine modulus of rupture and were subjected to a standardized cutting performance test on cast iron at 600 s.f.p.m. The modulus of rupture test was carried out on an Amsler machine using 3 point loading, 2 rollers and 1 ball, and was performed under standardized conditions for each piece tested. The results of these tests are summarized in Table 1.

TABLE 1

| Metal Content (total Mo+Ni), Percent | Modulus of Rupture (p.s.i.) | Wear on Tool (inches) |
|---|---|---|
| 3 | 112,000 | .024 |
| 5 | 142,000 | .020 |
| 10 | 142,000 | .010 |
| 15 | 126,000 | .010 |

The modulus of rupture is a good indication of the strength and toughness of a body. As will be seen, the test piece containing only 3 percent metal constituent not only showed greater wear but also had significantly less strength and toughness than tools according to the present invention which contain at least 5 percent metal constituent. On the basis of these test results it is readily apparent that in order to obtain the desired characteristics of wear resistance, hardness and strength, the cutting tools must be made from a mix containing at least 5 percent of molybdenum and nickel.

The inclusion of a mixture of molybdenum and nickel metal powders in the mixture from which the cutting tools are formed not only results in increased hardness, strength and wear resistance of the tool, but also permits the mixture to be hot-pressed at lower temperatures. It is well known that cutting tools attain their maximum strength when crystals of the composition from which such tools are made are small and the bodies have been compressed to maximum density. When the temperature at which the cutting tool is formed is very high the crystals tend to grow, with the result that the cutting tool has less strength. Therefore, it is apparent that a reduction in the temperature used in making the tool will tend to increase the strength of the cutting tool. In order to satisfactorily hot-press a mixture consisting of 70 percent titanium carbide and 30 percent titanium boride at 2000 p.s.i., a temperature of 1800° C. was required. However, upon the addition of 10 percent by weight of a metal constituent containing equal parts by weight of molybdenum and nickel metal powders to the mixture of 70 percent TiC, 30 percent TiB$_2$ the mass was satisfactorily hot-pressed at 2000 p.s.i. at 1530° C. and on increasing the metal constituent to 20 percent by weight the hot-pressing temperature was further reduced to 1500° C. while using a pressure of 2000 p.s.i.

The clear superiority of cutting tools made in accordance with this invention over cutting tools used heretofore is readily apparent from the drawing. This drawing shows a comparison of the hardness of bodies made in accordance with this invention as compared with certain cutting tool compositions heretofore used. The Rockwell A hardness is expressed as a function of the percentage of metal binder in the tool composition. On the basis of the comparison shown in the drawing it is obvious that cutting tools made according to this invention are harder and more wear-resistant than those heretofore used.

In addition to being superior in hardness to the materials compared in the drawing, cutting tools made from the titanium carbide-titanium boride-molybdenum-nickel composition of this invention are also superior in hardness to titanium boride alone or with a binder of molybdenum and nickel.

While the specification has primarily been concerned with cutting tools made from the novel composition containing titanium carbide, titanium boride, and molybdenum and nickel metal powders, it will be readily apparent to those skilled in the art that the entire cutting tool need not be made from this composition in order to obtain the superior results. Rather, it is to be understood that this invention is also intended to include within its scope cutting tools, at least the cutting tip of which is formed from a mixture of titanium carbide and titanium boride together with from about 5 percent to about 30 percent by weight of molybdenum and nickel metal powders.

It will be understood that various changes in the details, materials, steps and arrangements of parts which have herein been described in order to explain the nature of the invention, may be made by those skilled in the art within the principles and scope of the invention as expressed in the appended claims.

I claim:
1. A starting composition for the manufacture of hard, wear-resistant materials suitable for making cutting tool tips, said starting composition consisting essentially of about 70 percent to about 95 percent by weight of a ceramic constituent containing from about 70 percent to about 80 percent by weight powdered titanium carbide and about 30 percent to about 20 percent by weight of powdered titanium boride, and from about 30 percent to about 5 percent by weight of a mixture of approximately equal parts by weight of molybdenum and nickel metal powders.

2. A starting composition for the manufacture of hard, wear-resistant materials suitable for making cutting tool tips, said starting composition consisting essentially of about 80 percent to about 90 percent of a ceramic constituent containing about 70 percent by weight titanium carbide powder and about 30 percent by weight titanium boride powder, and from about 20 percent to about 10 percent by weight of a mixture of approximately equal parts by weight of molybdenum and nickel metal powders.

3. A hard, wear-resistant material suitable for making cutting tool tips, composed of titanium carbide, titanium, boride, and a metal binder consisting essentially of approximately equal parts by weight of molybdenum and nickel, said binder being present in an amount of from about 5 percent to about 30 percent by weight of the total mass, and the balance consisting essentially of from about 70 percent to about 80 percent by weight titanium carbide and from about 20 percent to about 30 percent by weight titanium boride.

4. A material as defined in claim 3 wherein the binder is present in an amount of from about 10 percent to about 20 percent by weight of the total mass.

5. A material as defined in claim 4 wherein the balance consists essentially of about 70 percent by weight titanium carbide and about 30 percent by weight titanium boride.

6. A hard, wear-resistant cutting tool tip which is composed of titanium carbide, titanium boride, and a metal binder, said binder consisting essentially of approximately equal parts by weight of molybdenum and nickel, said binder being present in an amount of from about 10 percent to about 20 percent by weight of the total mass, and the balance consisting essentially of from about 70 percent to about 80 percent by weight titanium carbide and from about 20 percent to about 30 percent by weight titanium boride.

7. A hard, wear-resistant cutting tool which is composed of titanium carbide, titanium boride, and a metal binder, said binder consisting essentially of approximately equal parts by weight of molybdenum and nickel, said binder being present in an amount of from about 10 percent to about 20 percent by weight of the total mass, and the balance consisting essentially of from about 70 percent to about 80 percent by weight titanium carbide and from about 20 percent to about 30 percent by weight titanium boride.

8. A hard, wear-resistant cutting tool composed of titanium carbide, titanium boride, and a metal binder, said binder consisting essentially of approximately equal parts by weight of molybdenum and nickel, said binder being present in an amount of from about 5 percent to about 30 percent by weight of the total mass, and the balance consisting essentially of from about 70 percent to about 80 percent by weight titanium carbide and from about 20 percent to about 30 percent by weight titanium boride, said tool being shaped by hot pressing.

References Cited by the Examiner

UNITED STATES PATENTS

| 2,044,853 | 2/1936 | Laise. | |
|---|---|---|---|
| 2,123,575 | 7/1938 | McKenna | 28—182.8 |
| 2,752,666 | 7/1956 | Goetzel | 29—182.8 |
| 2,798,810 | 7/1957 | Goetzel | 75—20 |
| 2,855,660 | 10/1958 | De Long | 29—195 |
| 2,908,966 | 10/1959 | Wagner | 29—195 |
| 2,967,767 | 1/1961 | Nishikori | 75—5 |
| 3,000,734 | 9/1961 | Grant | 75—201 |
| 3,102,024 | 8/1963 | Knapp | 75—5 |

HYLAND BIZOT, *Primary Examiner.*